United States Patent [19]

Sides

[11] Patent Number: 5,715,060
[45] Date of Patent: Feb. 3, 1998

[54] APPARATUS AND METHOD FOR MEASURING LINEAR NANOMETRIC DISTANCES USING EVANESCENT RADIATION

[75] Inventor: Paul J. Sides, Pittsburgh, Pa.

[73] Assignee: Carnegie Mellon University, Pittsburgh, Pa.

[21] Appl. No.: 613,699

[22] Filed: Mar. 11, 1996

[51] Int. Cl.$^6$ .................................................. G01B 11/14
[52] U.S. Cl. .................................................. 356/375
[58] Field of Search .................................. 356/375, 373

[56] References Cited

U.S. PATENT DOCUMENTS

| | | |
|---|---|---|
| 4,681,451 | 7/1987 | Guerra et al. . |
| 4,813,782 | 3/1989 | Yagi et al. . |
| 4,936,676 | 6/1990 | Stauffer . |
| 5,218,424 | 6/1993 | Summargren ............... 356/358 |
| 5,220,408 | 6/1993 | Mager . |
| 5,224,174 | 6/1993 | Schneider et al. . |
| 5,225,690 | 7/1993 | Sakai et al. . |
| 5,239,183 | 8/1993 | Kouno et al. . |
| 5,475,488 | 12/1995 | Fukuzawa et al. ............ 356/357 |
| 5,557,399 | 9/1996 | de Groot ..................... 356/357 |

OTHER PUBLICATIONS

Nasser A. Frej and Dennis C. Prieve; Hindered diffusion of a single sphere very near a wall in a nonuniform force field; J. Chem. Phys. 98 (9), May 1, 1993; 1993 American Institute of Physics; pp. 7552–7564; Pittsburgh, PA.

Dennis C. Prieve, Stacy G. Bike and Nasser A. Frej; Brownian Motion of a Single Microscopic Sphere in a Colloidal Force Field; Faraday Discuss. Chem. Soc., 1990, 90; pp. 209–222; Pittsburgh, PA (no month available).

P. A. Temple; Total internal reflection microscopy: a surface inspection technique; Applied Optics, vol. 20, No. 15, Aug. 1, 1981; pp. 2656–2664; China Lake, California.

Dennis C. Prieve and John Y. Walz; Scattering of an evanescent surface wave by a microscopic dielectric sphere; Applied Optics, vol. 32, No. 9, Mar. 20, 1993; pp. 1629–1641; Pittsburgh, PA.

John Y. Walz and Dennis C. Prieve; Prediction and Measurement of the Optical Trapping Forces on a Microscopic Dielectric Sphere; 1992 American Chemical Society; pp. 3073–3082; Pittsburgh, PA (no month available).

Herman Chew, Dau–Sing Wang and Milton Kerker; Elastic scattering of evanescent electromagnetic waves; Applied Optics, vol. 18, No. 15, Aug. 1, 1979; pp. 2679–2687; Potsdam, NY.

*Primary Examiner*—Frank G. Font
*Assistant Examiner*—Zandra V. Smith
*Attorney, Agent, or Firm*—Kirkpatrick & Lockhart LLP

[57] ABSTRACT

An apparatus and method is disclosed for measuring the distance between a first body having a first surface separated by a medium from a second body through the use of transmitted evanescent radiation. The first body is substantially radiation transparent and has a critical angle of total internal reflection with respect to the medium and the second body has an optically disseminative opposing surface, that is, the opposing surface inherently disseminates radiation nonspecularly, and is capable of frustrating total internal reflection when brought into close proximity with the first surface. The apparatus and method provides for directing incident radiation into the first body toward the first surface at an angle exceeding the critical angle for total internal reflection in the first body so as to transmit radiation to the optically disseminative opposing surface, measuring the intensity of the transmitted radiation disseminated by the optically disseminative opposing surface, and calculating the distance between the first surface and the optically disseminative opposing surface based on the measured intensity of the disseminated transmitted radiation. Preferably, the optically disseminative opposing surface is composed of a material having a heterogeneous or otherwise spatially varying refractive index or a material that is capable of absorbing and reemitting the transmitted radiation. The method and apparatus may be used in a preferred embodiment for testing the distance between a magnetic recording head and a recording disk.

50 Claims, 6 Drawing Sheets

APPARATUS AND METHOD FOR
MEASURING LINEAR NANOMETRIC
DISTANCES USING EVANESCENT
RADIATION

BACKGROUND OF THE INVENTION

1. Field of the Invention

The present invention is directed generally to the measurement of linear nanometric distances and, more particularly, to measuring such distance based on the intensity of transmitted evanescent radiation.

2. Description of the Background

The storage of electronic data using magnetic recording media typically involves the use of a magnetic transducing head and a rotating storage device, such as a computer hard disk. In practice, the magnetic head, or "slider", is brought into close proximity with the disk, while the disk is rotated to provide access to the entire disk. The rotation of the disk produces a moving air boundary layer adjacent to the face of the disk that exerts a force and lifts the head causing it to ride, or "fly", on the layer of air further removed from the surface of the disk. The efficiency and accuracy of data transmissions from the head to the disk depends on the proximity of the head to the disk. Technological advances have significantly increased the information bit density capabilities of storage media requiring that data be recorded with greater accuracy, thereby necessitating that the distance between the head and the disk, i.e. the gap, be made as small as possible. Extensive testing, known as "slider fly height testing", has been performed on mechanisms and devices used to control the distance between the magnetic head and the hard disk drive. The development of a mechanism for placement of a recording head within a few nanometers of a recording medium is a bifurcated problem of placing a head in close proximity to the disk and measuring the size of the gap to ensure that the head is sufficiently close to the disk.

Several methods have been developed to measure small (nanometric) distances between objects such as magnetic heads and storage devices. One of the early methods was based on the principle of optical interferometry, such as is disclosed in U.S. Pat. No. 4,813,782 to Yagi et al. Optical interference occurs when two wave trains of light of the same type meet; the resultant wave consists of bands, or fringes, of varying intensity and/or colors. This phenomenon can be used to measure the distance between two bodies having directly opposing surfaces in which one body is transparent by directing a light beam through the transparent body perpendicular to the surfaces. The reflected light beams, or wave trains, from each surface will also be perpendicular to the surfaces and the waves will recombine and interfere with one another. The recombined interfering light beams can then be detected and the band pattern is related to distance between the two bodies.

Interferometry techniques have a drawback in that the intensity of the interference pattern does not vary significantly with distance near the local maxima and minima (approximately every ¼ wavelength) and, consequently, the precision of techniques varies depending upon the size of the gap to be measured. An additional limitation of interferometry is that most commercial equipment can only perform measurements at one location at a time; therefore, time consuming point by point measurements must be made to map a surface.

Another method to measure distances is based on the phenomena of frustrated total internal reflection (FTIR).

Figure 1:
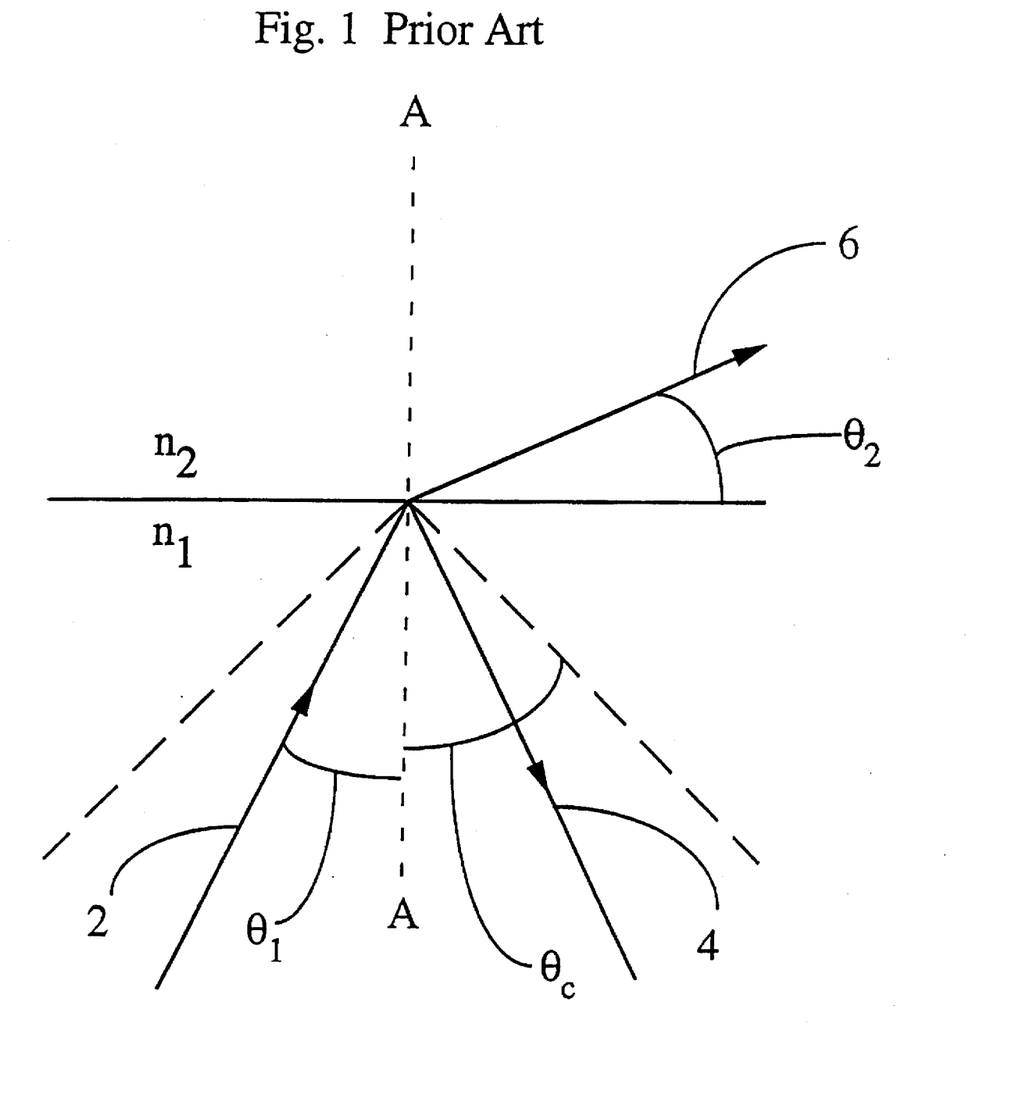
FIG. 1 illustrates a wave encountering an interface at an incident angle $\theta_1$ less than the critical angle, $\theta_c$, and which is partially reflected and partially refracted.

Referring to FIG. 1, total internal reflection (TIR) can occur at the boundary interface between two media in which the index of refraction of a first medium, $n_1$, is greater than a second medium, $n_2$, and an incident wave 2 travelling in the first medium encounters the interface at an angle of incidence $\theta_1$, measured relative to an axis A—A perpendicular to the interface. Generally, when the incident wave 2 traveling in the first medium encounters the interface at the angle $\theta_1$, the incident wave 2 will be partially reflected 4 and partially refracted, or transmitted, 6 in the second medium, at an angle, $\theta_2$. The angle of incidence $\theta_1$ and the angle of refraction $\theta_2$ are related by Snell's Law:

$$\sin \theta_2 = (n_1/n_2)\sin \theta_1 \qquad (1)$$

Figure 2:
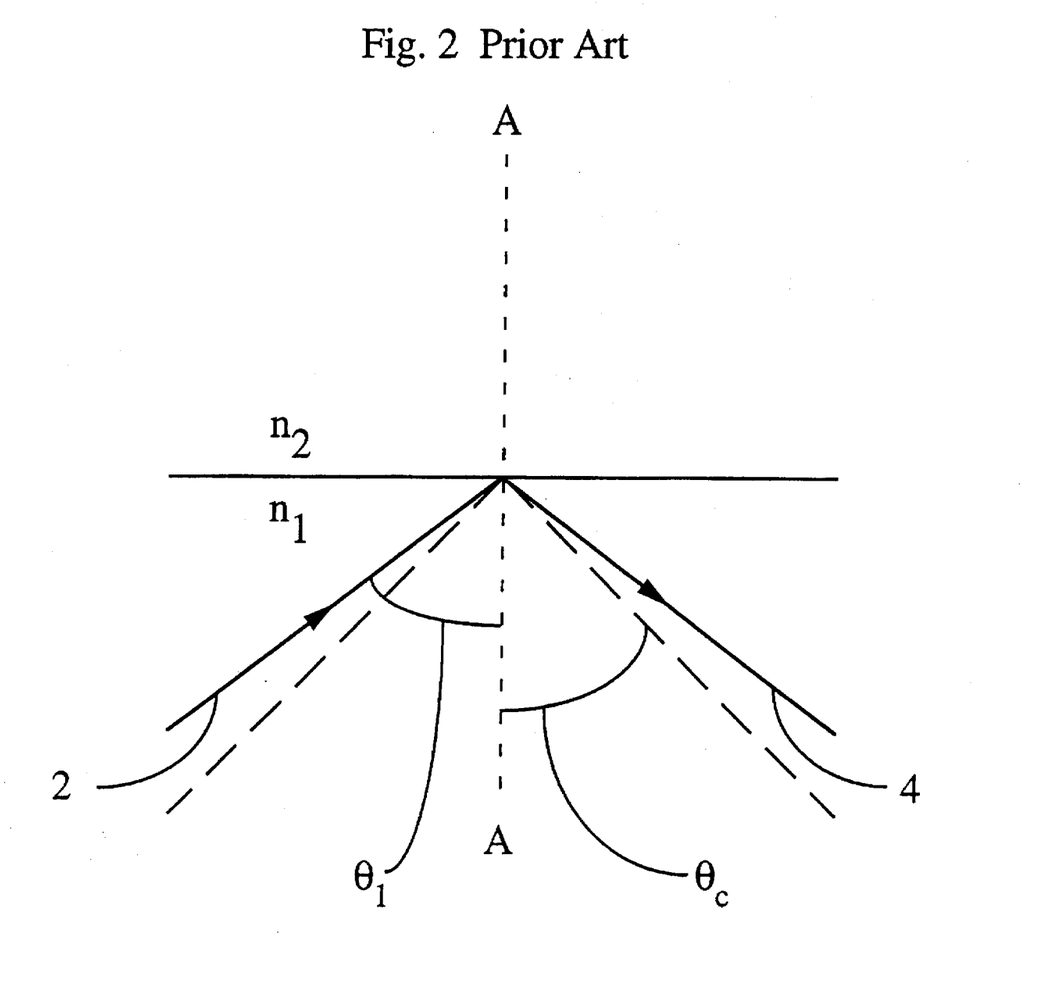
FIG. 2 illustrates a wave encountering an interface at an incident angle $\theta_1$ greater than or equal to $\theta_c$, which is totally internally reflected.

When the angle of incidence, $\theta_1$, is equal to or greater than a critical angle, $\theta_c$, the righthand side of the equation will be equal to or greater than unity and the incident wave 13 will be totally internally reflected as shown in FIG. 2.

Figure 3:
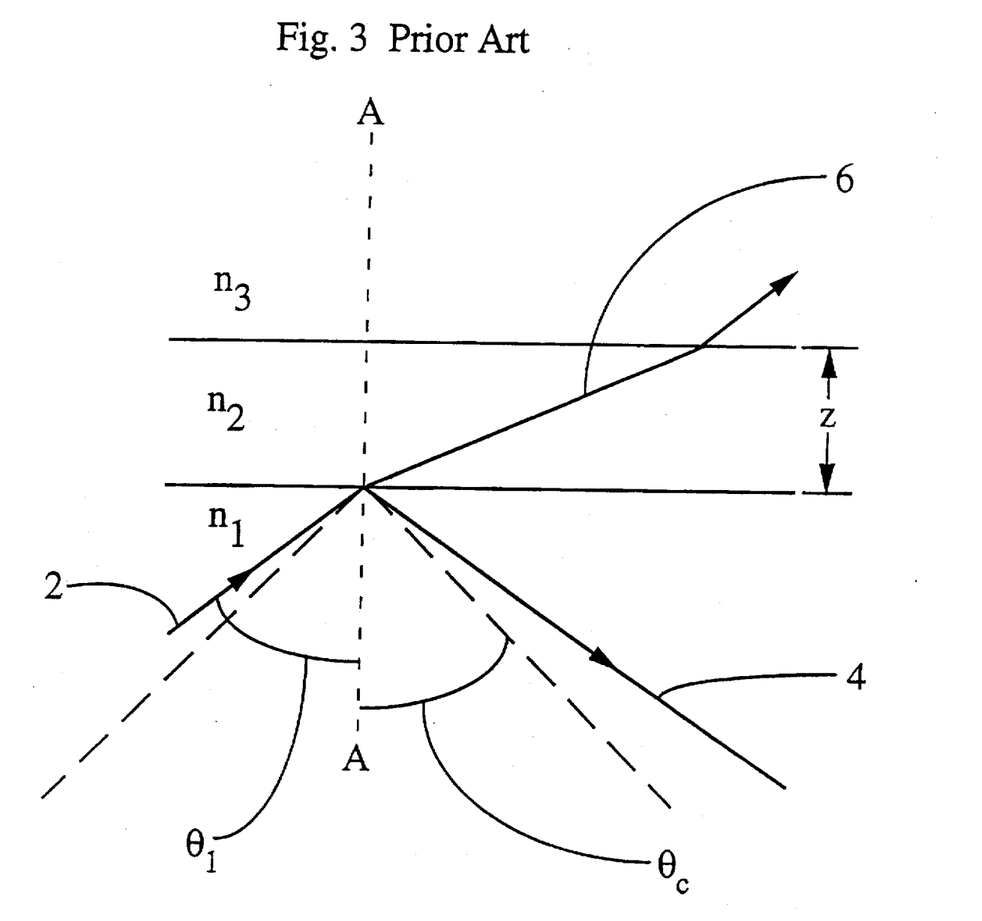
FIG. 3 illustrates a wave encountering an interface at an incident angle $\theta_1$ greater than or equal to $\theta_c$, in the presence of a third medium which frustrates total internal reflection.

Although the wave 2 is totally reflected, the electric field associated with the wave 2 extends into the second medium and decays exponentially over a short distance. If a third medium, as shown in FIG. 3, having an index of refraction $n_3$ greater than $n_2$ is moved sufficiently close to the first medium so that the electric field associated with the wave 2 extends from the first medium into the third medium, the wave 6 can be transmitted to the third medium, thereby frustrating total internal reflection. Because the amount of energy transmitted in the wave 6 and therefore the amount of energy reflected is a function of the distance z between the third and first media, the ratio of the intensity of the reflected energy to the intensity of the incident energy can be used to determine the distance between the two media. Examples of using frustrated internal reflection to measure distances by comparing the reflected and incident light intensities can be found in U.S. Pat. Nos. 5,257,093 to Mager et al, 5,239,183 to Kuono et al., and 5,225,690 to Sakai et al.

One difficulty with methods in the aforementioned patents for measuring small distances by comparing the reflected and incident intensities lies in the inherent nature of the TIR itself. For example, when a third medium is moved sufficiently close to the first medium, a small amount of the wave energy will be transmitted to the third medium representing the difference between the intensity of the reflected and incident waves. The difference in many cases is only a small percentage of the overall energy of the wave; therefore, a highly precise measurement system is required so that the small percentage change between the incident and reflected waves can be resolved from the inherent measurement error in the system. Often times, especially outside of a laboratory setting, the required resolution cannot be achieved. Furthermore, this technique requires precise alignment of the instruments to receive the reflected beam 4, which complicates the measurement.

Thus, the need exists for an apparatus and method which overcomes, among others, the above-discussed problems so as to provide for accurately measuring nanometric distances and surface roughness conditions in a cost effective and production worthy manner.

SUMMARY OF THE INVENTION

The present invention is directed to an apparatus and method for measuring distances between a first surface of a first body and an opposing surface of a second body separated by a medium. The first body is substantially radiation transparent and has a critical angle of total internal reflection with respect to the medium and the second body has an optically disseminative opposing surface, that is, the opposing surface inherently disseminates radiation nonspecularly as described in detail hereinafter, and is capable of frustrating total internal reflection when brought into close proximity with the first surface. The apparatus and method provide for directing incident radiation into the first body toward the first surface at an angle exceeding the critical angle for total internal reflection in the first body so as to transmit radiation to the optically disseminative opposing surface, measuring the intensity of the transmitted radiation disseminated by the optically disseminative opposing surface, and calculating the distance between the first surface and the optically disseminative opposing surface based on the measured intensity of the disseminated transmitted radiation. Preferably, the optically disseminative opposing surface is composed of a material having a heterogeneous or otherwise spatially varying refractive index or a material that is capable of absorbing and reemitting the transmitted radiation.

In a preferred embodiment for testing the distance between a magnetic recording head and a recording disk, the first body is a frustaconical shaped borosilicate glass prism that is rotated about its central axis to simulate the rotation of a hard disk drive and the second body is preferably an actual head or a slider composed of the same material as the head, such as aluminum oxide titanium carbide. Also, preferably a helium neon laser having a wavelength of 632.8 nm is used to provide visible light radiation directed toward the first surface of the first body at an angle of 60° from the normal. A charge coupled device (CCD) camera is used to detect the scattered light and create electronic signals which are sent to a computer attached to the camera for calculating the distances between the first and second bodies and displaying the results.

The present invention provides significant advantages over prior art methods for measuring the distance between two bodies in close proximity. One advantage is that the intensity of the transmitted light can vary exponentially with distance. This characteristic provides a high level of discrimination in the measurements over the range of interest that is not attainable with some prior art methods. Another advantage over the prior art is that when a second body is not sufficiently close to the first body so as to frustrate the total internal reflection, there is no transmitted radiation thereby providing a distinct transition in the measurements as a second body is moved into close proximity to the first body, whereas prior art methods using TIR relying on the reflected beam must distinguish between 100% reflection and nearly 100% reflection as the second body is moved into close proximity with the first body. Those advantages and benefits of the present invention, as well as others, will become apparent from the detailed description hereinbelow.

BRIEF DESCRIPTION OF THE DRAWINGS

For the present invention to be clearly understood and readily practiced, preferred embodiments of the present invention will be described in conjunction with the following figures wherein.

DESCRIPTION OF THE PREFERRED EMBODIMENTS

Figure 4:
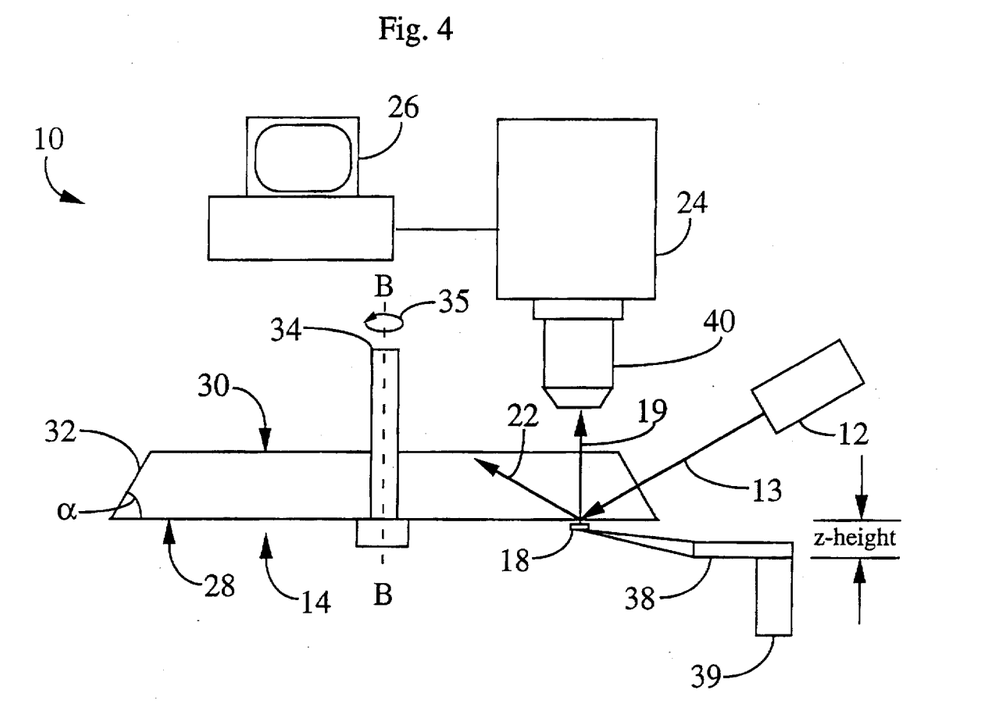
FIG. 4 illustrates a preferred embodiment of the apparatus for measuring the distances between the first and second bodies.
Figure 5:
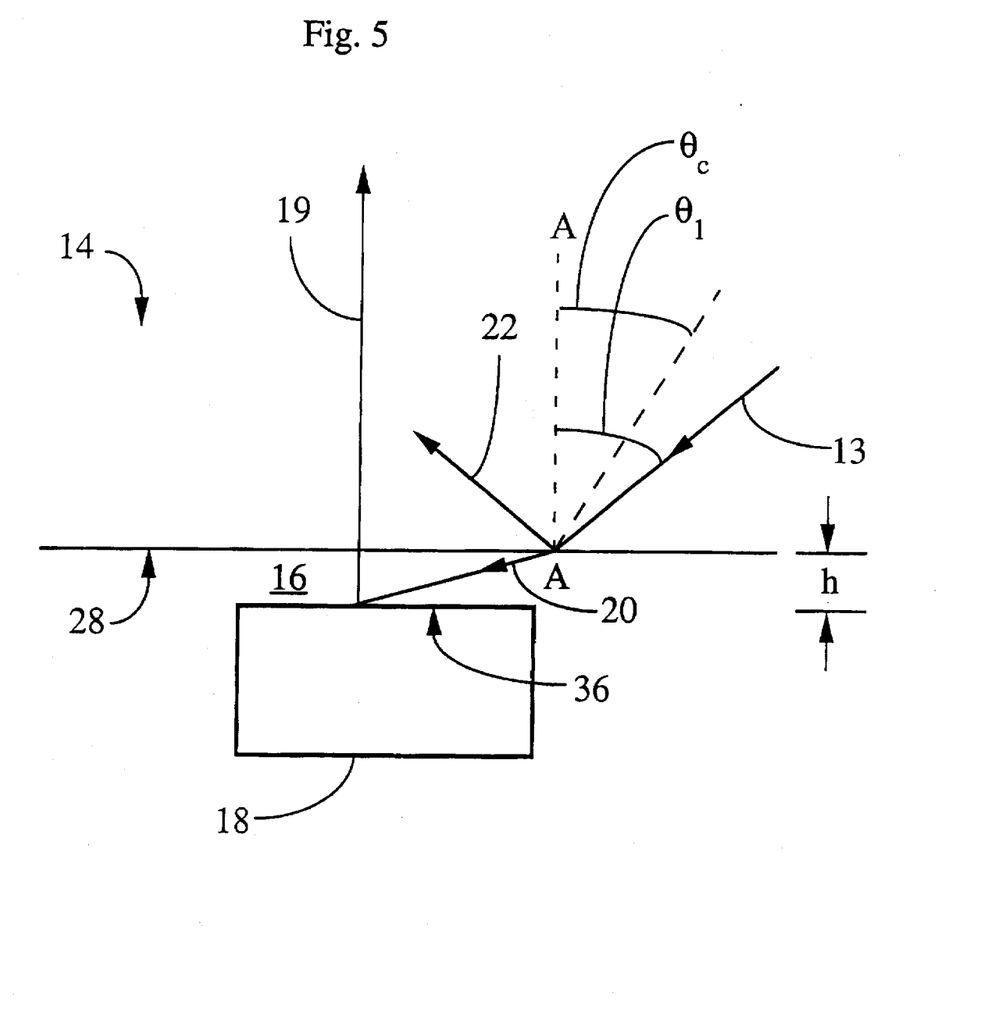
FIG. 5 illustrates an enlarged view of the region near the second body.

The operation of the apparatus 10 is based on the technique of Total Internal Reflection Microscopy (TIRM) and will be described generally with reference to the drawings for the purpose of illustrating present preferred embodiments of the invention only and not for purposes of limiting the same. Referring to FIGS. 4 and 5, in accordance with the present invention, a source 12 is used to direct incident electromagnetic radiation 13 into a radiation transparent first body 14 toward an interface with a medium 16 at an angle equal to or exceeding the critical angle, $\theta_c$, for TIR in the first body 14. If a second body 18 having a higher index of refraction, $n_3$, than the medium is placed in close proximity to the first body 14, TIR can be frustrated resulting in a transmission of some amount of the radiation 20 through the medium 16 and into the second body 18; the intensity of the reflected radiation 22 will be diminished by the amount of the transmitted radiation 20. The intensity, I, of the transmitted radiation 20 is a function of the distance, z, between the second body 18 and the first body 14 and can be described by the equation:

$$I(z) = I_0 \exp(-z/L_0) \qquad (2)$$

where, $I_0$ is a constant and $L_0$ is the exponential decay constant of the radiation, which is described by the equation:

$$L_0 = \lambda_0/(4\pi\sqrt{(n_1^2 \sin^2\theta_1 - n_2^2)}) \qquad (3)$$

where, $\lambda_0$ is the wavelength of the incident radiation. The transmitted radiation 20 will be reflected specularly, scattered, refracted or absorbed and reemitted by the second body 18 depending upon the surface characteristics and composition of the second body 18, as well as the type of incident electromagnetic radiation 13.

TIRM has been employed by researchers in the study of Brownian motion and the attractive and repulsive forces on unassociated micron size colloidal particles by taking advantage of the fact that a non-planar interface exists between the particle and the medium and will reflect the transmitted radiation in all directions, which in effect produces scattered radiation, as described by D.C. Prieve et al. in "Scattering of an Evanescent Surface Wave by a Microscopic Dielectric Sphere", Applied Optics Vol. 32, No. 9 (1993) and by Chew et al. in "Elastic Scattering of Evanescent Electromagnetic Waves", Applied Optics Vol. 18, No. 15 (1979). Although TIRM has been used for many years, the utility of the technique has been limited to the study of unassociated particles due to their unique physical characteristics. This limitation is well recognized in the prior art as stated in the Kouno patent column 5, lines 44–47, "Practically, the intensity of the reflected light Lr is measured instead of the intensity of the light Lt transmitted into the optically dense medium M3 on account of the difficulty in the measurement of the latter."

The inventor, however, has found that even a planar surface can be made to disseminate measurable nonspecular radiation if the second body is suitably composed of material capable of disseminating radiation, or if the surface is mechanically rough; then TIRM can be used to measure the distance between the first surface and the second surface. For example, if a perfectly planar, smooth, and flat opposing surface is parallel to the first surface and has a heterogeneous or otherwise spatially varying refractive index $n_3$, e.g. the second body is a composite material, then said second surface will scatter radiation from the evanescent wave. As a second example, if a perfectly planar opposing surface that is parallel to the first surface consists of a material that absorbs the evanescent wave and fluoresces, then said second surface will absorb the evanescent wave and reemit radiation. As used herein, an "optically disseminative" surface is defined as a surface consisting of a material or materials that inherently disseminate nonspecular radiation whether by scattering, by absorption and reemission or by any other means irrespective of the mechanical topography, such as flatness, roughness, roundness, or other surface finish, of the opposing surface or the character of the incident radiation. Thus, an optically disseminative surface, even though planar and parallel to the first surface, in fact can disseminate nonspecular radiation irrespective of its surface morphology and such radiation can usefully be employed to make a measurement of linear nanometric distance separating the first and second bodies. A specific example for testing magnetic heads employs aluminum oxide titanium carbide as the second body 18, which is a composite used in magnetic head production, having a heterogeneous refractive index and that will scatter transmitted radiation despite being mechanically smooth.

A detector 24 is positioned to detect the intensity of the scattered radiation 19 and is attached to a data acquisition/ analysis system 26 for processing the detected signals to determine the distance between the first and second bodies 14 and 18, respectively. While current preferred embodiments of the invention will be further described with respect to use of the apparatus 10 for testing the flying height of a magnetic head above a hard disk drive, one skilled in the art will appreciate that the invention can be suitably modified for use in other applications.

In a preferred embodiment, the incident electromagnetic radiation 13 is in the form of visible light and the source 12 is a helium neon (HeNe) laser 12 having a wave length, $\lambda_0$, of 632.8 nm. The HeNe laser 12 is preferred because of the ability to provide a concentrated, single wavelength source of radiation at an affordable cost. Other lasers, such as Argon ion, $CO_2$, Excimer, or dye lasers, or a collimated noncoherent light source can be suitable employed for providing the radiation source 12 and may include multiple sources and/or multiple wavelengths to provide redundancy and precision in the measurements. For instance, a multiple wavelength laser could be employed to provide simultaneous distance measurements at the same angle or additional lasers can be placed at varying angles to provide simultaneous measurements at different angles. While a preferred embodiment has been described using visible light, the type of electromagnetic radiation used in practicing the invention can be varied to suit the particular materials and conditions of interest by one skilled in the art.

In a preferred embodiment, the first body 14 is a prism 14 composed of a borosilicate glass having a refractive index, $n_1$, for visible light of approximately 1.5 and the medium is air having a refractive index, $n_2$, of 1.0 resulting in a critical angle for TIR of approximately 41.8°. The prism 14 is preferably frustaconically shaped having substantially smooth flat first and second surfaces, 28 and 30, respectively separated by a side 32 at a base angle of 60° relative to the first surface 28. The frustaconical shape is preferred because of the ease of manufacturing and the capability to direct the incident radiation 13 into the first body 14 perpendicular to the side 32 of the body 14 lessening the potential for reflection of the incident beam 13 from the side 32 of the prism. In testing the flying height of magnetic heads above a hard disk, the first body 14 is rotated about a central axis B—B using a shaft 34 that is torqued by conventional means, shown by arrow 35 in FIG. 4, such as a motor (not shown), to simulate the rotation of the hard disk.

Figure 6:
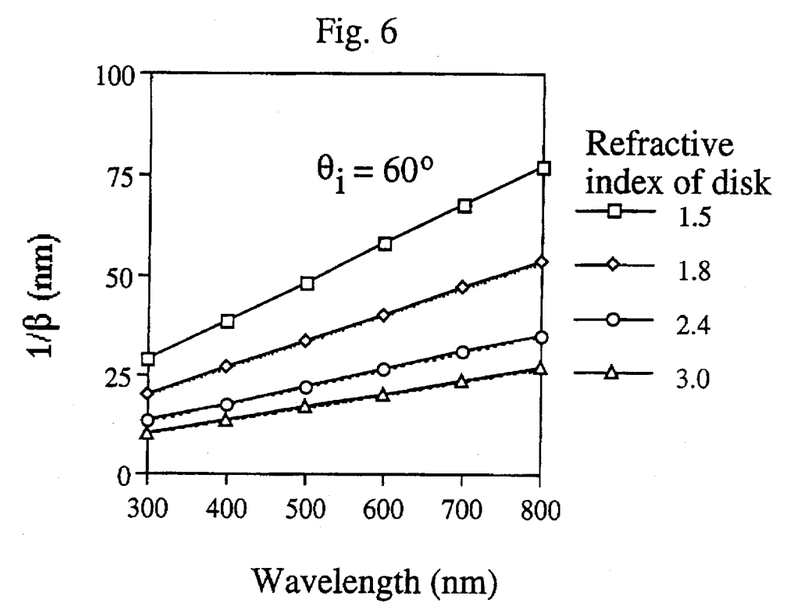
FIG. 6 illustrates the dependence of the decay constant on the wavelength of the incident radiation and the refractive index of the first body; and, FIG. 7 is a plot of the measured distance between the first and second bodies as a function z-height.

Other materials, angles, and shapes can be used for the first body 14 as appropriate. Choosing a sufficiently transparent material of a higher refractive index, such as silicon, gallium arsenide, zinc sulfide, gadolinium gallium garnet, zinc selenide, or titanium dioxide, would decrease the $L_0$ calculated in equation (3), as shown in FIG. 6, and therefore, make the preferred embodiment more sensitive to smaller distances between the first body 14 and second body 18. Furthermore, one might coat the first surface 28 of the first body 14 with a different material such as the abovementioned materials or amorphous carbon or diamond, and/or lubricants to improve performance with a material not available in bulk form and to make the first surface 28 of the first body 14 resistant to damage due to planned or inadvertent contact with the second body 18. Likewise varying the angle $\alpha$ of incidence can change $L_0$. Indeed, a spherical shape of the second surface of the first body would allow an infinite number of angles between the critical angle and 90° to be explored. While a preferred embodiment has been described using uncoated borosilicate glass in a frustaconical shape with an acute angle of 60°, the precise composition and shape of the first body and the wavelength of the radiation source can be varied to suit conditions of interest by one skilled in the art.

The second body 18 preferably has an optically disseminative opposing surface 36 that is brought into close proximity and in direct opposition to the first surface 28 of the first body 14 using a flexure arm 38 or other support that is attached to a support mechanism 39 to be tested. Preferably, the second body 18 is an actual head or a slider 18 composed of a mechanical resilient oxide having a heterogeneous or otherwise spatially varying refractive index, such as aluminum oxide-titanium carbide. The opposing surface 36 of the second body 18 is typically highly polished; however, the composite nature of the head results in a heterogeneous refractive index with respect to the HeNe laser 12 resulting in a surface that is optically disseminative in that when the second body 18 is moved into the electric field of the incident wave 13 generated by the HeNe laser 12, the different compounds in the composite scatter the transmitted radiation 20 to produce scattered waves 19. Alternatively, the surface characteristics can be varied to affect the transmitted radiation 20 either by mechanical roughening or through the use of a coating. For instance, a specularly reflective surface can be coated with a material that itself is optically disseminative such as fluorescent. As such, the present invention can also be used to map the roughness of the surface body and the quality/integrity of a coating over discrete locations on the second body. In addition, specularly reflective material can be used in conjunction with a detector 24 to receive the reflected transmitted radiation 20 or the second body 18 can be radiation transparent requiring that the detector 24 be positioned accordingly to detect the transmitted radiation 20.

In a preferred embodiment, the detector 24 is a CCD camera 24 directed toward the second surface 30 of the first body 14 opposite the location of the second body 18. It is also preferred that a microscope 40 is attached to the camera 24 to provide for focusing the viewing range of the camera 24 to discriminate the surface scattering, such as in mapping applications to allow the measuring of the intensity of the scattered radiation 19 at discrete locations on the opposing surface 36 of the second body 18. It can be appreciated that the positioning of the detector 24, as well as the type of detector 24, will necessarily depend upon the type of radiation source 12 used in the apparatus 10 and the composition and surface condition of the opposing surface 36 of the second body 18. The data acquisition/analysis system 26 is preferably a computer 26 attached to the CCD camera 24, which is used to calculate the flying height as described below. Alternatively, a photomultiplier can be used in lieu of separate detector and data acquisition system and the computer 26 would then be used for analysis purposes only.

The operation of the apparatus 10 will first be described with reference to the use of the apparatus 10 in a slider flying height test device. The opposing surface 36 of the slider 18 is initially placed in contact with the first surface 28 of the prism 14 using flexure arm 38 or a comparable mechanism for compliant contact. The laser 12 is directed through the prism 14 toward a portion of the first surface 28 in contact with the opposing surface 36 of the slider 18, at a base angle, $\alpha$, that is at least equal to the critical angle, $\theta_c$. The presence of the slider 18 in contact with the prism 14 frustrates TIR and the transmitted radiation 20 is scattered by the slider 18. The intensity of the scattered radiation 19 is detected and converted to electrical signals using the CCD camera 24 which are fed to the computer 26 which is used to calculate the calibration constant $I_0$ in equation (2) with z=0. When measurements are taken at discrete locations, the computer 26 is used to determine the maximum intensity, which is used to calculate the calibration constant $I_0$, or the calibration constant $I_0$ can be based on the intensity measured at a fixed discrete location. In applications where the surfaces are preferably not brought into contact, the $I_0$ can be determined either at a known distance between the actual surfaces or using a dedicated calibration device, such as is described in U.S. Pat. No. 5,220,408 issued Jun. 15, 1993 to Mager.

The prism 14 is then rotated to simulate the rotation of a hard disk. The rotation of the prism produces a moving boundary layer of air that lifts the slider 18 off the prism 14 to a flying height that depends upon the rotational speed of the prism 14. The laser 12 is directed at the base angle $\alpha$ through the prism 14 toward the portion of the first surface 28 in close proximity to the opposing surface 36 of the slider 18. The presence of the slider 18 in close proximity to the prism 14 frustrates TIR and the transmitted radiation 20 is scattered by the slider 18. Equation (2) can be rearranged to calculate the flying height directly using the intensity of the scattered radiation 19, I(z):

$$z = -L_0 \ln(I(z)/I_0) \qquad (4)$$

Figure 7:
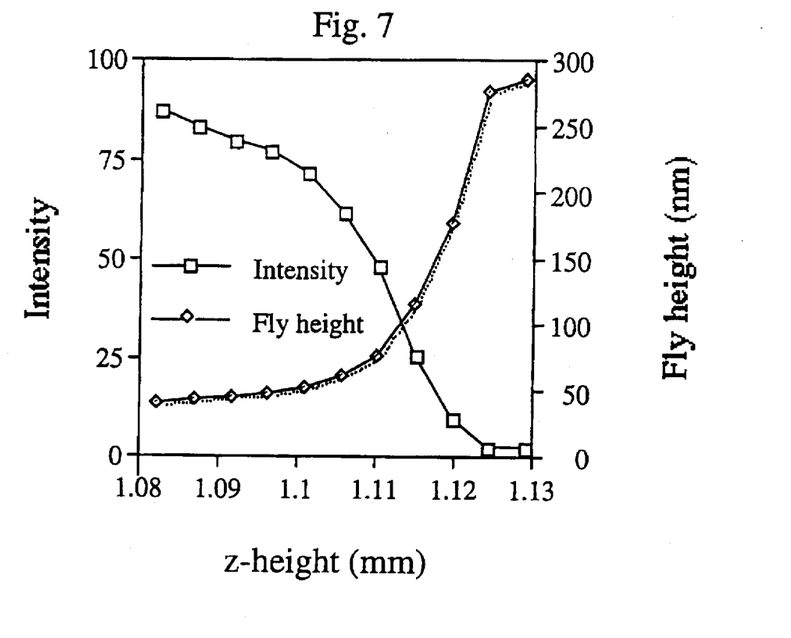

Intensity data from an apparatus of the type depicted in FIG. 5 and the flying height data calculated therefrom is shown in FIG. 7. The disk is frustaconically shaped borosilicate prism having a first surface with a two inch radius and a base angle of 60° and a refractive index of 1.5 was rotated at 1900 rpm. The slider has a 70% (IBM 3370 type) 2 rail taper flat slider with a nominal flying height of 4 microns at a linear velocity of 1.6 m/s and a z-height of 43.5 mils. A HeNe laser having a wavelength of 632.8 nm was used providing a decay length of 61 nm. A positioning device 39 supporting the flexure arm at the end away from the slider, was used to bring the slider into close proximity with the disk, where the spring force of the flexure arm, called the load, was balanced by the pressure within the moving boundary layer of air between the slider and the disk. A disk-drive standard way of specifying the approach and load of the flexure arm is to report the distance between the surface of the positioner, that supports the flexure arm and the disk, as shown in FIG. 5. This distance is termed the z-height and is typically several orders of magnitude greater than the desired separation between the slider itself and the disk. Thus the flexure arm is specified as being capable of exerting a 5 gram load on the slider toward the surface when the z-height of is 0.043 inches or 1.09 millimeters. In the experiment, the results of which are depicted in FIG. 7, the slider was first positioned well away from the disk, i.e. at a large z-height, and the z-height was decreased while intensity measurements were made. This process yielded the intensity data in FIG. 7. The intensity measurements were converted into flying height of the slider using equation 4 plotted in FIG. 7. The nominal flying height for the type of slider used 100 nm at a z-height of 1.09 mm, which exceeds the experimentally obtained value by approximately 40 nm. This difference is believed to be within the range of expected fly heights considering the 100 nm is the nominal value and differences associated with the experimental apparatus used to perform the testing.

The use of TIRM provides additional utility in applications such as magnetic head flexure arm testing in which there is a concern not only with the distance separating the head and the disk, but whether contact occurs between the head and the disk and characterizing the condition, or topography, of the first and opposing surfaces, 28 and 36, respectively. In addition, the method of the present invention can not only indicate whether contact has occurred, but the length of time over which contact occurred and whether any damage has occurred to either the first surface 28 or the opposing surface 36. TIRM has been previously described as a method to provide static post-test surface measurements on a single body by P. A. Temple, "Total internal reflection Microscopy: a surface inspection technique", Applied Optics Vol. 20, No. 15 (1981). The utility of the present invention for dynamic wear measurement is of increasing importance, because the improvement of performance of disk drives depends critically on decreasing the distance between the slider and the disk. Contact between the disk and the slider will become a more frequent accident and eventually a design feature so that contact occurs in a controlled fashion. It is therefore highly desirable to have the capability to detect contact or z=0 and any resulting damage in magnetic head/disk drive applications, as well as other applications.

The present invention has been described in conjunction with preferred embodiments thereof. Many modifications and variations of the disclosed embodiments of the apparatus and method will be apparent to those of ordinary skill in the art. The foregoing disclosure and the following claims are intended to cover all such modifications and variations.

What is claimed is:

1. An apparatus for measuring the distance between a first surface of a first body and an optically disseminative opposing surface of a second body separated by a medium, wherein the first body is substantially radiation transparent and has a critical angle of total internal reflection with respect to the medium and the opposing surface of the second body is composed of a material that frustrates total internal reflection in the first body when brought into close proximity with the first surface, said apparatus comprising:

a radiation source positioned to direct incident radiation into the first body toward the first surface at an angle exceeding the critical angle for total internal reflection in the first body;

a detector positioned to measure the intensity of transmitted radiation disseminated by the optically disseminative opposing surface; and, a system for determining the distance between the first surface and the optically disseminative opposing surface based on the measured intensity of the disseminated transmitted radiation to the exclusion of radiation reflected from said first surface.

2. The apparatus of claim 1 wherein said system is calibrated to a measured intensity of the transmitted radiation at a known reference distance.

3. The apparatus of claim 1 wherein said radiation source comprises at least one laser.

4. The apparatus of claim 3 wherein said detector comprises a charge coupled device camera positioned to generate electronic signals in response to the transmitted radiation.

5. The apparatus of claim 4 wherein said system comprises a computer connected to receive said electronic signals from said charge coupled device camera and to determine the distance between the first and second bodies using said electronic signals.

6. The apparatus of claim 5 wherein the first body is a borosilicate glass having a frustaconical shape and a second surface and, said laser comprises a helium neon laser having a wavelength of 632.8 nm; and, said charge coupled device camera is positioned relative to the second surface of the first body.

7. An apparatus for measuring the distance between two bodies separated by a medium, said apparatus comprising:

a rotatable substantially radiation transparent first body having a substantially flat first surface and a critical angle of total internal reflection with respect to the medium;

a second body attached to a support and having an opposing surface comprised of a material that frustrates total internal reflection in said first body and nonspecularly disseminates transmitted radiation, said second body being held with said opposing surface in close proximity to said first surface by said support;

a radiation source positioned to direct incident radiation into the first body toward the first surface at an angle exceeding the critical angle for total internal reflection in the first body;

a detector positioned to measure the intensity of transmitted radiation disseminated by the optically disseminative opposing surface; and, a system for determining the distance between said first surface and said opposing surface based on the measured intensity of the disseminated transmitted radiation to the exclusion of radiation reflected from said first surface.

8. The apparatus of claim 7 wherein said opposing surface comprises an optically disseminative material.

9. The apparatus of claim 8 wherein said opposing surface comprises a material capable of absorbing and reemitting transmitted radiation.

10. The apparatus of claim 8 wherein said opposing surface comprises a material having a heterogeneous refractive index.

11. The apparatus of claim 10 wherein said opposing surface comprises an aluminum oxide-titanium carbide composite.

12. The apparatus of claim 7 wherein said radiation source comprises a visible light source.

13. The apparatus of claim 12 wherein said detector comprises a charge coupled device camera positioned to generate electronic signals in response to the transmitted radiation.

14. The apparatus of claim 13 wherein said system comprises a computer connected to receive electronic signals from said CCD camera and to determine the distance between the first and second bodies using said electronic signals.

15. The apparatus of claim 14 wherein said first body comprises a material selected from the group consisting of borosilicate glass, silicon, gallium arsenide, zinc sulfide, gadolinium gallium garnet, zinc selenide, and titanium dioxide.

16. The apparatus of claim 15 wherein:

said first body further comprises a frustaconically shaped body having a second surface and a side extending between said first and second surfaces defining a base angle with said first surface; and said visible light source comprises a laser and said laser being directed at said first surface through said side of said first body.

17. The apparatus of claim 16 wherein said charge coupled device camera is directed toward said second body through said second surface of said first body.

18. The apparatus of claim 17 wherein:

said first body further comprises a base angle of 60°; and, said laser comprises a helium neon laser having a wavelength of 632.8 nm.

19. The apparatus of claim 18 wherein said second body comprises an aluminum oxide-titanium carbide composite.

20. A method of measuring the distance between a first body having a first surface separated by a medium from an optically disseminative opposing surface of a second body, wherein the first body is substantially radiation transparent and has a critical angle of total internal reflection with respect to the medium and the opposing surface of the second body is composed of a material that frustrates total internal reflection in the first body when brought into close proximity with the first surface, said method comprising:

providing a calibration constant based on a measured intensity of transmitted radiation disseminated by the opposing surface at a known distance from the first surface;

directing incident radiation into the first body toward the first surface at an angle exceeding the critical angle for total internal reflection in the first body;

measuring an intensity of transmitted radiation disseminated by the opposing surface; and, calculating the distance between the first surface and the opposing surface based on the measured intensity of the disseminated transmitted radiation and the calibration constant to the exclusion of radiation reflected from the first surface.

21. The method of claim 20 wherein said step of providing comprises:

positioning the second body in a reference position of known distance from the first surface;

directing incident radiation into the first body toward the first surface at an angle exceeding the critical angle for total internal reflection in the first body so as to transmit radiation to the opposing surface;

measuring the intensity of the transmitted radiation disseminated by the opposing surface; and, calculating the calibration constant based on the measured intensity of the transmitted radiation.

22. The method of claim 21 wherein:

said step of measuring the intensity further comprises measuring the intensity of transmitted radiation disseminated by the opposing surface at discrete locations over the surface of the second body;

said step of calibrating further comprises comparing the measured intensities of the discrete locations to determine a maximum intensity after said step of measuring the intensity; and, said step of calculating the calibration constant further comprises calculating the calibration constant based on the maximum intensity of the transmitted radiation and calculating the difference between the distance at the discrete locations on the surface of the second body based on the measured intensity of the transmitted radiation at the discrete location and the maximum intensity.

23. The method of claim 21 wherein said step of positioning the second body comprises positioning the second body in contact with the first body.

24. The method of claim 20 wherein said step of directing incident radiation comprises directing incident radiation in the form of visible light into the first body.

25. The method of claim 24 wherein the second body is composed of a material capable of disseminating visible light and, said step of measuring the intensity comprises measuring the intensity of the disseminated light.

26. The method of claim 24 wherein the second body is composed of aluminum oxide-titanium carbide and the first body is a prism composed of a borosilicate glass, and, said step of directing radiation in the form of visible light further comprises directing a helium neon laser having a wavelength of 632.8 nm; and, said step of measuring the intensity comprises measuring the intensity of the disseminated light.

27. The method of claim 24 wherein the second body is composed of a material capable of absorbing and reemitting visible light and said step of measuring the intensity comprises measuring the intensity of the reemitted light.

28. The method of claim 20 further comprising the step of characterizing the first surface based on radiation scattered by the first surface to determine whether wear of the first surface has occurred.

29. The method of claim 20 further comprising the step of characterizing the opposing surface based on radiation scattered by the opposing surface to determine whether wear of the opposing surface has occurred.

30. The method of claim 28, further comprising the step of characterizing the opposing surface based on radiation scattered by the opposing surface to determine whether wear of the opposing surface has occurred.

31. An apparatus for measuring the distance between two bodies separated by a medium, said apparatus comprising:

a rotatable substantially radiation transparent first body having a substantially flat first surface and a critical angle of total internal reflection with respect to the medium;

means for rotating said first body in a plane parallel to said first surface;

a second body attached to a support and having an opposing surface capable of frustrating total internal reflection and nonspecularly disseminating transmitted radiation and said opposing surface comprising an optically disseminative material having a heterogeneous refractive index, said second body being held in close proximity with said first surface by said support;

means for directing incident radiation into said first body toward said first surface at an angle exceeding the critical angle for total internal reflection in said first body so as to transmit radiation to said opposing surface;

means for measuring the intensity of the transmitted radiation disseminated by said opposing surface; and, means for calculating the distance between said first surface and said opposing surface based on the measured intensity of the disseminated transmitted radiation.

32. The apparatus of claim 31 wherein said opposing surface comprises a material capable of absorbing and reemitting transmitted radiation.

33. The apparatus of claim 31 wherein said opposing surface comprises an aluminum oxide-titanium carbide composite.

34. An apparatus for measuring the distance between two bodies separated by a medium, said apparatus comprising:

a rotatable substantially radiation transparent first body having a substantially flat first surface and a critical angle of total internal reflection with respect to the medium;

means for rotating said first body in a plane parallel to said first surface;

a second body attached to a support and having an opposing surface capable of frustrating total internal reflection and nonspecularly disseminating transmitted radiation and said opposing surface comprising an optically disseminative material having a heterogeneous refractive index, said second body being held in close proximity with said first surface by said support;

a source of visible radiation positioned to direct incident radiation into said first body toward said first surface at an angle exceeding the critical angle for total internal reflection in said first body so as to transmit radiation to said opposing surface;

means for measuring the intensity of the transmitted radiation disseminated by said opposing surface; and, means for calculating the distance between said first surface and said opposing surface based on the measured intensity of the disseminated transmitted radiation.

35. The apparatus of claim 34, wherein said means for measuring comprises a charge coupled device camera capable of generating an electronic signal pattern in response to the transmitted radiation.

36. The apparatus of claim 35, wherein said means for calculating comprises a computer for reading said electronic signal and calculating the distance between the first and second bodies therefrom.

37. The apparatus of claim 35 wherein said first body comprises a material selected from the group consisting of borosilicate glass, silicon, gallium arsenide, zinc sulfide, gadolinium gallium garnet, zinc selenide, and titanium dioxide.

38. The apparatus of claim 37 wherein:

said first body further comprises a frustaconically shaped body having a second surface and a side extending between said first and second surfaces defining a base angle with said first surface; and said visible radiation source comprises a laser and said laser being directed at said first surface through said side of said first body.

39. The apparatus of claim 38 wherein said charge coupled device camera is directed toward said second body through said second surface of said first body.

40. The apparatus of claim 39 wherein:
   said first body further comprises a base angle of 60°; and,
   said laser comprises a helium neon laser having a wavelength of 632.8 nm.

41. The apparatus of claim 40 wherein said second body comprises an aluminum oxide-titanium carbide composite.

42. A method of measuring the distance between a first body having a first surface separated by a medium from an optically disseminative opposing surface of a second body, the first body being substantially radiation transparent and having a critical angle of total internal reflection with respect to the medium and the opposing surface of the second body being capable of frustrating total internal reflection when brought into close proximity with the first surface, said method comprising:
   directing incident radiation into the first body toward the first surface at an angle exceeding the critical angle for total internal reflection in the first body so as to transmit radiation to the opposing surface;
   measuring the intensity of the transmitted radiation disseminated by the opposing surface;
   calculating the distance between the first surface and the opposing surface based on the measured intensity of the disseminated transmitted radiation; and,
   calibrating the measured intensity of the transmitted radiation at a known reference distance prior to said step of calculating the distance, wherein said step of calibrating further comprises,
   positioning the second body in a reference position of known distance from the first surface,
   directing incident radiation into the first body toward the first surface at an angle exceeding the critical angle for total internal reflection in the first body so as to transmit radiation to the opposing surface,
   measuring the intensity of the transmitted radiation disseminated by the opposing surface; and,
   calculating the calibration constant based on the measured intensity of the transmitted radiation.

43. The method of claim 42 wherein:
   said step of measuring the intensity further comprises measuring the intensity of transmitted radiation disseminated by the opposing surface at discrete locations over the surface of the second body;
   said step of calibrating further comprises comparing the measured intensities of the discrete locations to determine a maximum intensity after said step of measuring the intensity; and,
   said step of calculating the calibration constant further comprises calculating the calibration constant based on the maximum intensity of the transmitted radiation and calculating the difference between the distance at the discrete locations on the surface of the second body based on the measured intensity of the transmitted radiation at the discrete location and the maximum intensity.

44. The method of claim 42 wherein said step of positioning the second body comprises positioning the second body in contact with the first body.

45. The method of claim 42 wherein said step of directing incident radiation comprises directing incident radiation in the form of visible light into the first body.

46. The method of claim 45 wherein the second body is composed of a material capable of disseminating visible light and, said step of measuring the intensity comprises measuring the intensity of the disseminated light.

47. A method of measuring the distance between a first body having a first surface separated by a medium from an optically disseminative opposing surface of a second body, wherein the first body is substantially transparent to visible light and has a critical angle of total internal reflection with respect to the medium and the opposing surface of the second body is composed of a material that frustrates total internal reflection in the first body when brought into close proximity with the first surface, said method comprising:
   providing a calibration constant based on a measured intensity of transmitted visible light disseminated by the opposing surface at a known distance from the first surface;
   directing incident visible light comprising a laser into the first body toward the first surface at an angle exceeding the critical angle for total internal reflection in the first body;
   measuring an intensity of transmitted visible light disseminated by the opposing surface; and,
   calculating the distance between the first surface and the opposing surface based on the measured intensity of the disseminated transmitted visible light and the calibration constant to the exclusion of visible light reflected from the first surface.

48. A method of measuring the distance between a first body having a first surface separated by a medium from an optically disseminative opposing surface of a second body, wherein the first body is substantially radiation transparent and has a critical angle of total internal reflection with respect to the medium and the opposing surface of the second body is composed of a material that absorbs radiation and reemits visible light and frustrates total internal reflection in the first body when brought into close proximity with the first surface, said method comprising:
   providing a calibration constant based on a measured intensity of transmitted radiation disseminated by the opposing surface at a known distance from the first surface;
   directing incident radiation into the first body toward the first surface at an angle exceeding the critical angle for total internal reflection in the first body;
   measuring an intensity of transmitted radiation in the form of reemitted visible light disseminated by the opposing surface; and,
   calculating the distance between the first surface and the opposing surface based on the measured intensity of the disseminated transmitted radiation and the calibration constant to the exclusion of radiation reflected from the first surface.

49. A method of measuring the distance between a first body having a first surface separated by a medium from an optically disseminative opposing surface of a second body, the first body being substantially radiation transparent and having a critical angle of total internal reflection with respect to the medium and the opposing surface of the second body being capable of frustrating total internal reflection when brought into close proximity with the first surface, said method comprising:
   directing incident radiation into the first body toward the first surface at an angle exceeding the critical angle for total internal reflection in the first body so as to transmit radiation to the opposing surface;
   measuring the intensity of the transmitted radiation disseminated by the opposing surface;

calculating the distance between the first surface and the opposing surface based on the measured intensity of the disseminated transmitted radiation; and, characterizing the first surface based on radiation scattered by the first surface to determine whether wear of the first surface has occurred.

50. The method of claim 49 further comprising the step of characterizing the opposing surface based on radiation scattered by the opposing surface to determine whether wear of the opposing surface has occurred.

* * * * *